United States Patent
Luyster et al.

(10) Patent No.: US 9,004,167 B2
(45) Date of Patent: Apr. 14, 2015

(54) METHODS OF USING INVERT EMULSION FLUIDS WITH HIGH INTERNAL PHASE CONCENTRATION

(75) Inventors: Mark Luyster, Houston, TX (US); Arvind D. Patel, Sugar Land, TX (US); Sooi Kim Lim, Houston, TX (US)

(73) Assignee: M-I L.L.C., Houston, TX (US)

(*) Notice: Subject to any disclaimer, the term of this patent is extended or adjusted under 35 U.S.C. 154(b) by 721 days.

(21) Appl. No.: 13/053,990

(22) Filed: Mar. 22, 2011

(65) Prior Publication Data

US 2012/0067575 A1 Mar. 22, 2012

Related U.S. Application Data

(63) Continuation-in-part of application No. PCT/US2010/049752, filed on Sep. 22, 2010.

(60) Provisional application No. 61/244,731, filed on Sep. 22, 2009.

(51) Int. Cl.
*E21B 43/04* (2006.01)
*C09K 8/36* (2006.01)
*E21B 43/08* (2006.01)
*C09K 8/82* (2006.01)

(52) U.S. Cl.
CPC . *C09K 8/36* (2013.01); *E21B 43/04* (2013.01); *E21B 43/08* (2013.01); *E21B 43/088* (2013.01); *Y10S 507/925* (2013.01)

(58) Field of Classification Search
None
See application file for complete search history.

(56) References Cited

U.S. PATENT DOCUMENTS

| | | |
|---|---|---|
| 3,817,329 A | 6/1974 | Rankin |
| 4,381,241 A | 4/1983 | Romenesko et al. |
| 6,291,406 B1 | 9/2001 | Rose et al. |
| 6,488,946 B1 | 12/2002 | Milius et al. |
| 6,562,764 B1 * | 5/2003 | Donaldson et al. ........... 507/277 |
| 6,589,917 B2 | 7/2003 | Patel et al. |
| 6,734,144 B2 | 5/2004 | Varadaraj et al. |
| 6,883,608 B2 | 4/2005 | Parlar et al. |
| 7,373,978 B2 | 5/2008 | Barry et al. |
| 7,803,743 B2 * | 9/2010 | Jones et al. ................... 507/203 |
| 2003/0069143 A1 | 4/2003 | Collins |

(Continued)

FOREIGN PATENT DOCUMENTS

| | | |
|---|---|---|
| CN | 1927895 A | 3/2007 |
| EP | 111959 A2 | 6/1984 |

(Continued)

OTHER PUBLICATIONS

International Search Report with Written Opinion issued in related International Application No. PCT/US2010/049752 dated Jun. 28, 2011 (9 pages).

(Continued)

*Primary Examiner* — Zakiya W Bates (57) ABSTRACT

In a method of gravel packing a wellbore in a subterranean formation, the wellbore comprising a cased section and an uncased section, the method may include pumping into the wellbore a gravel pack composition comprising gravel and a carrier fluid comprising an invert emulsion fluid, where the invert emulsion fluid may comprise: an oleaginous external phase; a non-oleaginous internal phase, wherein a ratio of the oleaginous external phase and non-oleaginous internal phase is less than 50:50 and an emulsifier stabilizing the oleaginous external phase and the non-oleaginous internal phase.

15 Claims, 6 Drawing Sheets

(56) References Cited

U.S. PATENT DOCUMENTS

| | | | |
|---|---|---|---|
| 2004/0122111 A1 | 6/2004 | Varadaraj et al. | |
| 2004/0147404 A1* | 7/2004 | Thaemlitz et al. | 507/100 |
| 2004/0259738 A1 | 12/2004 | Patel | |
| 2005/0124499 A1 | 6/2005 | Shinbach et al. | |
| 2005/0202978 A1* | 9/2005 | Shumway | 507/203 |
| 2006/0272815 A1* | 12/2006 | Jones et al. | 166/278 |
| 2007/0049500 A1* | 3/2007 | Mueller et al. | 507/136 |
| 2007/0135310 A1 | 6/2007 | Qu et al. | |
| 2007/0219098 A1 | 9/2007 | Mueller et al. | |
| 2012/0181029 A1* | 7/2012 | Saini et al. | 166/307 |

FOREIGN PATENT DOCUMENTS

| | | |
|---|---|---|
| GB | 2309240 A | 7/1997 |
| WO | 2004/050790 A1 | 6/2004 |
| WO | 2004090067 A2 | 10/2004 |
| WO | 2008086385 A1 | 7/2008 |
| WO | 2009047478 A1 | 4/2009 |
| WO | 2011037954 A2 | 3/2011 |

OTHER PUBLICATIONS

S. Kelkar et al.; "Development of an Oil-Based Gravel-Pack Carrier Fluid"; SPE 64978; 2001.

L.B. Ledlow et al.; "High-Pressure Packing with Water: An Alternative Approach to Conventionaly Gravel Packing"; SPE 26543; 1993.

B. Baser et al.; "An Alternative Method of Dealing With Pressure: Friction Reducer for Water Packing of Long Horizontal Open Holes in Low-Fracturing-Gradient Environments"; SPE 123155; 2009.

S. Shenoy et al.; "Guildelines for Shale Inhibition During Openhole Gravel Packing With Water-Based Fluids"; SPE 103156; 2006.

PetroWiki; "Stability of Oil Emulsions"; http://petrowiki.org/Stability_of_oil_emulsions; page last modified Sep. 13, 2013 (10 pages).

American Petroleum Institute; "Standard Procedure for Field Testing Oil-Based Drilling Fluids"; API Recommended Practice 13B-2; Feb. 1998 (81 pages).

Darley, et al; "Composition and Properties of Drilling and Completion Fluids"; 5th Edition, Gulf Publishing Company; pp. 328-332; 1988 (4 pages).

Ezzat, et al; "Solids-Free Brine-in-Oil Emulsions for Well Completion"; SPE 17161—SPE Drilling Engineering, vol. 4, No. 4; pp. 300-306; Dec. 1989 (7 pages).

Guiping, et al; English Abstract of "Study on Stability of Super-concentrated Inverse E-mulsion Polymerization of AA/AM/AMPS as a Filtrate Reducer"; Chemical Engineering of Oil & Gas, vol. 35, No. 3; Jun. 2006 (4 pages).

Guiping, et al; English Abstract of "Super-concentrated AA/AM/AMPS Tercopolymer Inverse Emulsion as Filtrate Reducer for Water Base Drilling Fluids"; Oilfield Chemistry, vol. 23, No. 1; Mar. 25, 2006 (6 pages).

Hecker, et al; "Reducing Well Cost by Gravel Packing in Nonaqueous Fluid"; SPE 90758—SPE Annual Technical Conference and Exhibition, Houston, Texas; Sep. 26-29, 2004 (7 pages).

Lim, et al; "New Surfactant Allows for Higher Internal Phase in Non-Aqueous Systems"; American Association of Drilling Engineers, AADE-11-NTCE-06; Apr. 12-14, 2011 (11 pages).

Luyster, et al; "New Approach for Completion Applications with Higher Internal Phase Inverts Utilizing Innovative Surfactants"; SPE 144131—European Formation Damage Conference, Noordwijk, The Netherlands; Jun. 7-10, 2011 (11 pages).

Parlar, et al; "Gravel Packing Wells Drilled With Oil-Based Fluids: A Critical Review of Current Practices and Recommendations for Future Applications"; SPE 89815—SPE Annual Technical Conference and Exhibition, Houston, Texas; Sep. 26-29, 2004 (15 pages).

Powers, et al; "A Critical Review of Chirag Field Completions Performance—Offshore Azerbaijan B"; SPE 98146—International Symposium and Exhibition on Formation Damage Control, Lafayette, Louisiana; Feb. 15-17, 2006 (13 pages).

Whaley, et al; "Greater Plutonio Openhole Gravel-Pack Completions: Fluid Design and Field Applications"; SPE 107297—European Formation Damage Conference, Scheveningen, The Netherlands; May 30-Jun. 1, 2007 (18 pages).

\* cited by examiner

METHODS OF USING INVERT EMULSION FLUIDS WITH HIGH INTERNAL PHASE CONCENTRATION

CROSS-REFERENCE TO RELATED APPLICATIONS

This application, pursuant to 35 U.S.C. §120, is a continuation-in-part of PCT/US2010/049752, filed on Sep. 22, 2010, the contents of which are herein incorporated by reference in its entirety.

BACKGROUND OF INVENTION

1. Field of the Invention

Embodiments disclosed herein relate generally to invert emulsion wellbore fluids. In particular, embodiments disclosed herein relate to invert emulsion fluid having a high internal phase concentration.

2. Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

In most rotary drilling procedures the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud.

Many wells, especially in oil fields in shale formations (having water sensitivity) and/or deep-water/subsea environments, are drilled with synthetic/oil-based muds or drilling fluids. Because of the extremely high cost of intervention and high production rates, these wells require reliable completion techniques that prevent sand production and maximizes productivity throughout the entire life of the well. One such technique is open-hole gravel packing.

There are two principal techniques used for gravel packing open holes: (1) the alternate path technique and (2) the water packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

In unconsolidated formations, sand control measures are implemented to stabilize formation sand. Common practice for controlling sand displacement includes placement of a gravel pack to hold formation sand in place. The gravel pack is typically deposited around a screen. The gravel pack filters the sand while still allowing formation fluid to flow through the gravel, the screen and a production pipe.

Most of the recently discovered deep-water fields contain a high fraction of shales, which are water-sensitive, although many have been gravel packed with water-based fluids. A very large fraction of them have been completed with viscous fluids using the alternate path technique. Viscoelastic surfactant (VES) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

In wells drilled with synthetic or oil-based muds (often the case for high shale fractions and/or deep water wells), three main approaches have been used for gravel packing. A first approach involves displacement of the entire wellbore to water-based fluids at the end of drilling the reservoir section, and subsequently running the sand control screens into the open hole, setting the packer and gravel packing with a water based fluid. However, as experienced by several operators, the problem with this approach is that exposure of reactive shales to water-based fluids for prolonged time periods can cause shale collapse or swelling which effectively reduces the wellbore diameter and makes it impossible to install sand control screens to the target depth (see SPE 89815, SPE 90758) or shale dispersion into the carrier fluid during gravel packing which can have a significant impact on well productivity (Ali et al.—Petroleum Engineer International, March 1999). The success of this approach is therefore heavily dependent on the reactivity of the shales.

One approach subsequently practiced involved installation of a pre-drilled (perforated) liner in oil-based mud, then displacement of the entire wellbore to water based fluids, subsequent installation of the sand control screens to target depth and finally gravel packing with a water based fluid. This approach solved the problem of inability to run the screens to target depth, since shale collapse would occur onto the pre-drilled liner, and the space inside the predrilled liner would be substantially free of shales, allowing the screens to be installed to target depth. The problems with this approach were two fold. First, it involved two trips (one for predrilled liner installation and another for screen installation), which is costly, particularly in deep water where rig costs are high. Secondly, a smaller size screen had to be installed into the wellbore, which in some cases can limit production rates, and thus increase the costs.

A more recent approach that has been practiced heavily in two deepwater Angola developments (see SPE 90758 and SPE 107297) and an oilfield in Azerbaijan (see SPE 98146) involved conditioning of the oil based mud by passing the mud through shaker screens of a certain size (to prevent plugging of sand screens), then running the sand screens in conditioned oil based mud, and subsequently displacing the wellbore to water based fluids and proceeding with gravel packing with a water based carrier fluid (U.S. Pat. Nos. 6,883,608 and 7,373,978). This approach has been successfully used in more than 75 wells to date by two major operators, in conjunction with the alternate path (shunt-tube) screens.

While the above-described methods may be adequate for installing sand screens and gravel packing in many wells formed in reactive shale-containing formations, there exists a continuing need for improvements in the completion fluids used during such methods.

SUMMARY OF INVENTION

In one aspect, embodiments disclosed herein relate to a method of gravel packing a wellbore in a subterranean formation, the wellbore comprising a cased section and an uncased section, where the method includes pumping into the wellbore a gravel pack composition comprising gravel and a carrier fluid comprising an invert emulsion fluid, where the invert emulsion fluid comprises: an oleaginous external phase; a non-oleaginous internal phase, wherein a ratio of the oleaginous external phase and non-oleaginous internal phase is less than 50:50 and an emulsifier stabilizing the oleaginous external phase and the non-oleaginous internal phase.

In another aspect, embodiments disclosed herein relate to a method of completing a wellbore penetrating a subterranean formation, the wellbore comprising a cased section and an uncased section, where the method includes introducing invert emulsion fluid into the cased section of the wellbore, the invert emulsion fluid comprising: an oleaginous external phase; a non-oleaginous internal phase, wherein a ratio of the oleaginous external phase and non-oleaginous internal phase is less than 50:50; and an emulsifier stabilizing the oleaginous external phase and the non-oleaginous internal phase; and running a liner, sand control screen assembly, swell packer assembly, or inflow control device to a selected depth within the uncased section of the wellbore in which the invert emulsion fluid is located.

Other aspects and advantages of the invention will be apparent from the following description and the appended claims.

DETAILED DESCRIPTION

In one aspect, embodiments disclosed herein relate to methods of completion techniques that use invert emulsion fluids during the technique(s). More particularly, the present disclosure is directed toward the use of invert emulsion wellbore fluids in gravel packing and/or installing liners and/or sand control screens in a wellbore that may contain reactive shale or clay or in which the use of invert emulsion fluids may otherwise be desirable. As used herein, the expressions "reactive shale" or "reactive clay" or similar expressions may be used interchangeably and refer to those shale or clay materials that may swell, crumble, particalize, flake, slough off or otherwise deteriorate when exposed to aqueous fluids, particularly fresh water.

An invert emulsion is a water-in-oil emulsion, where an oleaginous fluid serves as a continuous phase and a non-oleaginous fluid serves as a discontinuous phase, the non-oleaginous fluid being stabilized or emulsed in the oleaginous fluid by an emulsifying agent. However, in particular, the completion techniques of the present disclosure use invert emulsion fluids having an oil/water ratio of less than 50/50, which may also be referred to as high internal phase ratio (HIPR) invert emulsions or high internal phase emulsions (HIPE). Such HIPR invert emulsions are discussed in more detail below.

As mentioned above, in the drilling of a well, the drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where, in accordance with some embodiments of the present disclosure, a sand control screen assembly is placed to facilitate gravel packing for controlling the migration and production of formation sand and to stabilize the formation of the open hole section.

Once the wellbore is drilled and the casing cemented into place, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections.

After the open hole and cased hole sections are displaced with the respective displacement fluids, the drilling string may be removed from the wellbore and the desired sand control screen assembly may be run or lowered to a selected depth within the open hole section of the well bore. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer may be positioned and set in the casing above the sand screen to isolate the interval being packed. A crossover service tool may also be provided with the assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a water-based carrier fluid is introduced into the wellbore to facilitate gravel packing of the open hole section of wellbore in the annulus surrounding the sand control screen. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member. The carrier fluid is conducted to the crossover tool and into the annulus between the casing and the tubular member above the packer.

As mentioned above, there are two techniques for gravel packing openhole horizontal wells: "water packing" and viscous-fluid packing or the "alternate path" technique. These techniques have completely different packing mechanisms, each having its own advantages and limitations. However, in accordance with the present disclosure, either packing technique may use the HIPR invert emulsions of the present disclosure.

Water packing involves gravel packing with a low viscosity carrier fluid (conventionally a completion brine) by a high fluid velocity. Gravel is generally added to the fluid at low concentrations and is transported by viscosity. Completion brines are conventionally used as the carrier for such technique, as the technique relies on the carrier fluid possessing Newtonian (or near-Newtonian) fluid properties for the annulus to be filled in accordance with this technique. While conventional invert emulsions generally do not have desirable properties (ability to possess low viscosity with high density: as density increases by increasing the internal phase volume, the viscosity of the fluid likewise increases) for water packing, the HIPR invert emulsions of the present disclosure possess both low viscosity and high density.

Figure 1A:
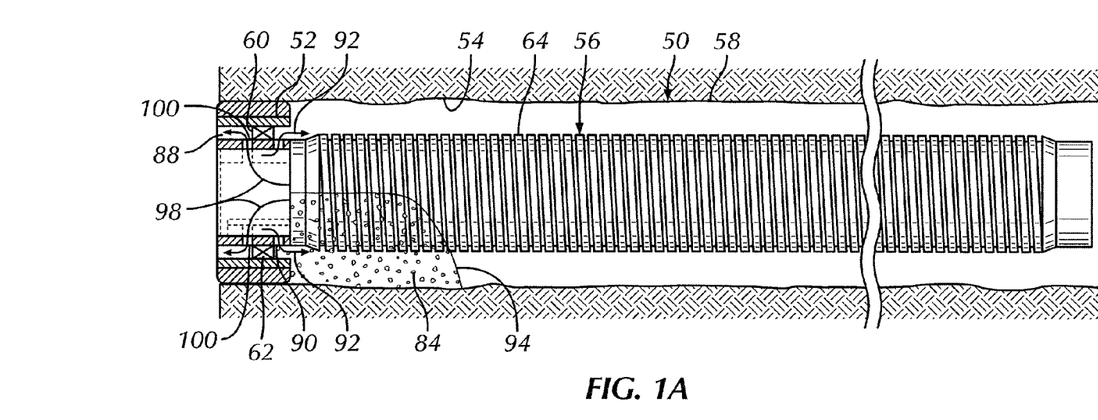
FIGS. 1A-1D show cross-sectional views of a completion interval depicting various stages of a gravel packing operation.
Figure 1B:
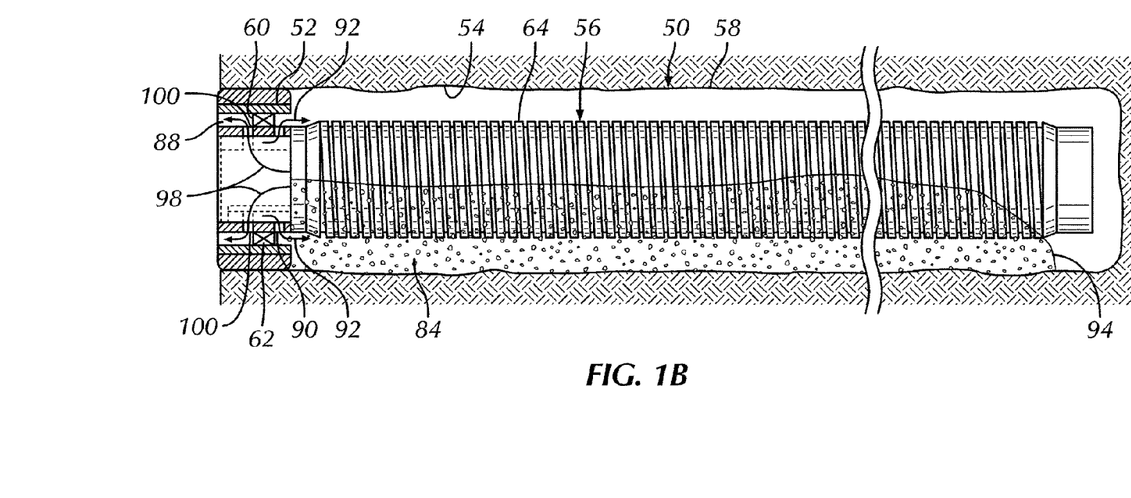
Figure 1C:
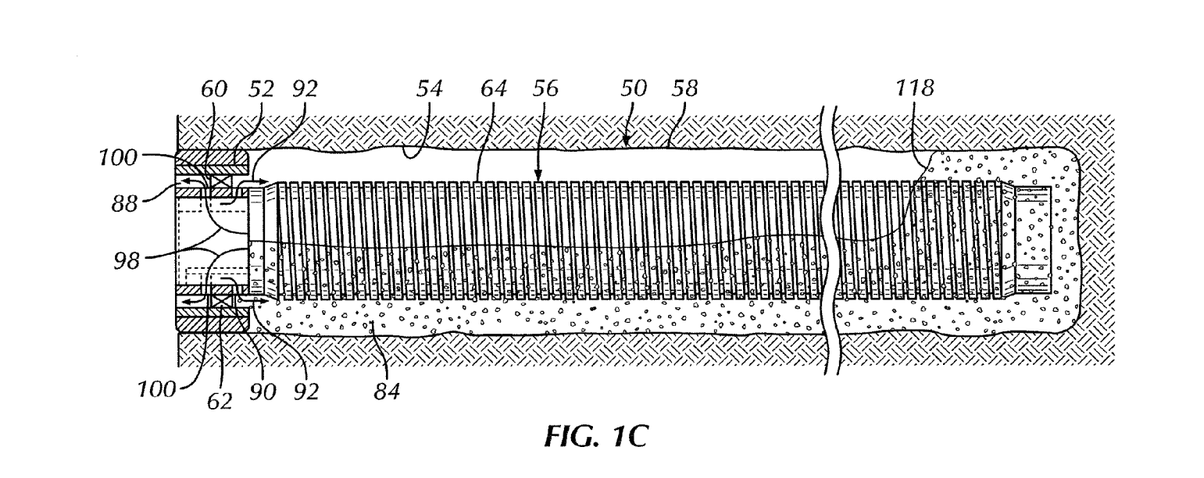
Figure 1D:
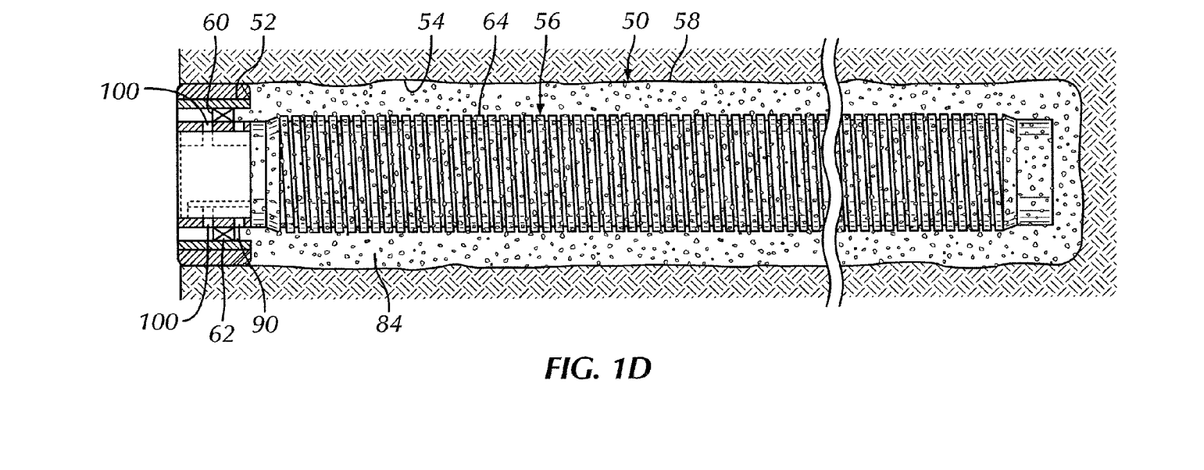

Referring to FIGS. 1A-1D, a schematic of a horizontal open hole completion interval of a well that is generally designated 50 being filled by a water packing (alpha beta) technique is shown. As shown in FIG. 1A, casing 52 is cemented within a portion of a well 54 proximate the heel or near end of the horizontal portion of well 54. A work string 56 extends through casing 52 and into the open hole completion interval 58. A packer assembly 60 is positioned between work string 56 and casing 52 at a cross-over assembly 62. Work string 56 includes one or more sand control screen assemblies such as sand control screen assembly 64. Sand control screen assembly 64 includes a base pipe 70 that has a plurality of openings 72 which allow the flow of fluids therethrough.

Gravel packing the interview is accomplished by delivering fluid slurry 84 down work string 56 into cross-over assembly 62. Fluid slurry 84 exits cross-over assembly 62 through cross-over ports 90 and is discharged into horizontal completion interval 58 as indicated by arrows 92. In the illustrated embodiment of water packing, fluid slurry 84 then travels within production interval 58 with portions of the gravel dropping out of the slurry and building up on the low side of wellbore 54 from the heel to the toe of wellbore 54 as indicated by alpha wave front 94 of the alpha wave portion of the gravel pack. At the same time, portions of the carrier fluid pass through sand control screen assembly 64 and travel through annulus 96 between wash pipe assembly 76 and the interior of sand control screen assembly 64. These return fluids enter the far end of wash pipe assembly 76, flow back through wash pipe assembly 76 to cross-over assembly 62, as indicated by arrows 98, and flow into annulus 88 through cross-over ports 100 for return to the surface.

As shown through the progression of FIGS. 1A-1D, the water packing operation starts with the alpha wave depositing gravel on the low side of the wellbore 54 progressing from the near end (heel) to the far end (toe) of the production interval. Gravitational forces dominate this "alpha" wave, so gravel settles until reaching an equilibrium height. If fluid flow remains above the crucial velocity for particle transport, gravel will move down a horizontal section toward the toe. Once the alpha wave has reached the far end, a second "beta" wave phase as indicated by beta wave front 118 begins to deposit gravel in the high side of the wellbore, on top of the alpha wave deposition, progressing from the far (toe) end to the near (heel) end of the production interval. The beta wave requires enough fluid velocity to maintain turbulent flow and move gravel along the top of the wellbore annulus.

Figure 2:
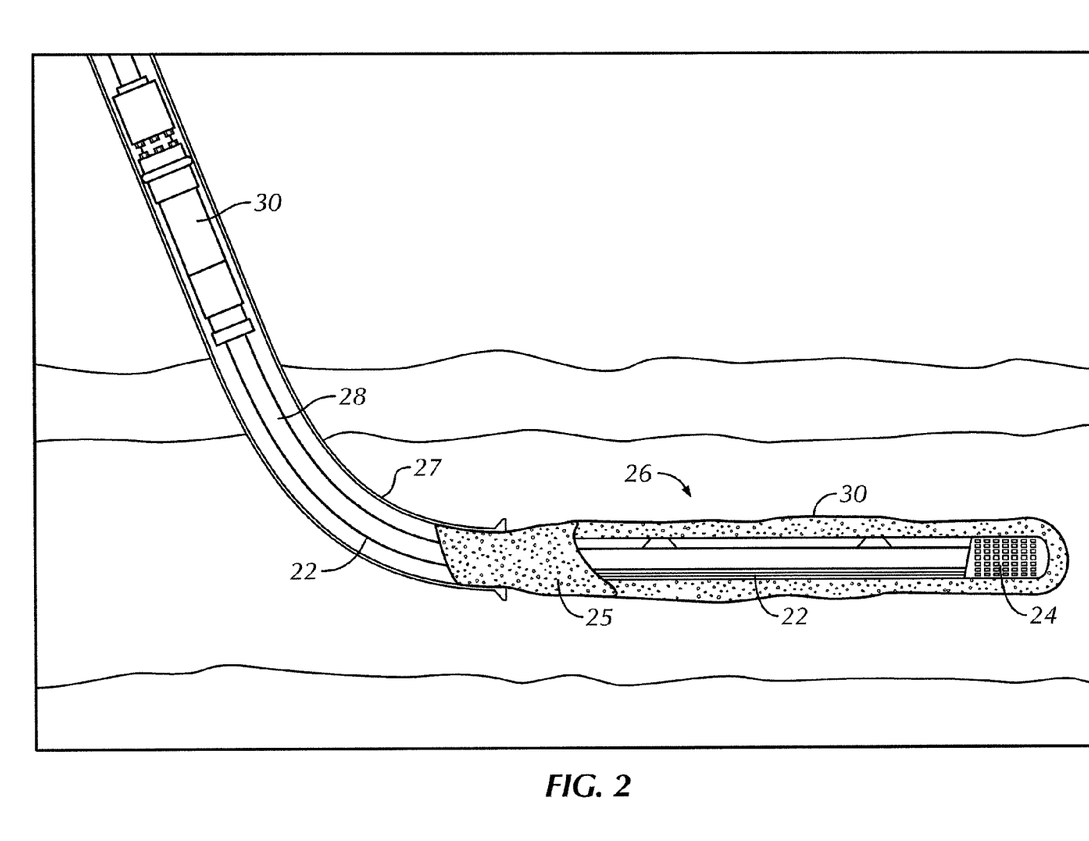
FIG. 2 shows a schematic view of a completion interval depicting a gravel packing operation.

While the HIPR invert emulsions of the present disclosure may be used in water packing by alpha and beta waves, the HIPR invert emulsions may also be formulated with viscosifiers (such as those disclosed herein) to formulate a viscosified fluid that be used to gravel pack by the alternate path technique. As shown in FIG. 2, the gravel slurry 20 is diverted to flow through shunt tubes 22 on the outside of the screen assembly 24, which provide an alternative pathway for the slurry 20. The gravel slurry exits from nozzles (not shown) on the shunt tubes 22 to form a pack 25 in a heel to toe manner. As the gravel settles within the open hole section 26 surrounding the screen 24, the carrier fluid passes through the screen 24 and into the interior of the tubular member 28. The carrier fluid is conducted to the crossover tool 30 and into the annulus between the casing 27 and the tubular member 28 above the packer (not shown).

Under either packing technique, the gravel particles may be ceramics, natural sand or other particulate materials suitable for such purposes. The gravel particles are sized so that they will not pass through the screen openings. Typical particle sizes in U.S. mesh size may range from about 12 mesh (1.68 mm) to about 70 mesh (0.210 mm); however, a combination of different particle sizes may be used. Examples of typical particle size combinations for the gravel particles are from about 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). The gravel particles may be coated with a resin to facilitate binding of the particles together. The resin-coated particles may be pre-cured or may cure in situ, such as by an overflush of a chemical binding agent or by elevated formation temperatures.

In addition to (or instead of) using the HIPR invert emulsions as a carrier fluid for gravel packing, in accordance with the present disclosure, the HIPR invert emulsions may also be used during the placement of sand control screens and/or liners, as well as other completion equipment.

The HIPR invert emulsion fluids may be used with almost any type of liner or and/or sand control screen assembly. These may include pre-holed liners, slotted, liners, wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. Further, as described above, the sand control screen assembly may also include those with alternate flow paths or shunt tubes. Moreover, screen assemblies may also include those that include diverter valves for diverting fluid returns through a shorter pathway, preventing pressure build up during the gravel packing process. Other completion equipment with which the HIPR invert emulsions may be used includes packer assemblies (including swell packer assemblies), which separate upper annuli from lower production equipment in a well, or inflow control devices, which limit the inflow of fluids into the production tubing) The particular type of equipment is of no limitation on the present disclosure; rather, the HIPR invert emulsions may be used with any type of equipment while the equipment is being run in the hole or during subsequent completion operations prior to the well being put into production. Further, depending on the arrangement, one or more of such completion equipment may be used in combination with each other.

In accordance with embodiments of the present disclosure, prior to installing sand control screens (using the HIPR fluids or not) and/or gravel packing (using the HIPR fluids or not), the drilling fluid may optionally be first displaced from the open hole section to a displacement fluid, and a second fluid may optionally be used to displace the fluid in a cased hole section. Displacement of the drilling fluids from the open hole section may be carried out by introducing the displacement fluid into the wellbore by passing the displacement fluid through the tubular drill string to the open hole section. As the displacement fluid is pumped through the drill string, the drilling fluids in the open hole section are carried upward through the annulus formed by the casing and the drill string.

In a particular embodiment, if the formation includes reactive clays, the displacement fluid for the open hole section may include the HIPR invert emulsions to help maintain the integrity of the open hole section containing reactive shales or clays that could otherwise be damaged if water-based fluids were used to displace the drilling fluids. In certain embodiments, the volume of first displacement fluid used may be sufficient to displace the open hole section plus the cased hole section up to the packer setting depth.

When a sufficient volume of the first displacement fluid is introduced into the wellbore to displace the drilling fluid from the open hole section of the wellbore, a second displacement fluid (optionally the same or different than the first) is used to displace at least a portion or all of the cased hole section of the wellbore. In certain embodiments, the volume of the second fluid may be sufficient to displace the entire cased section above the packer setting depth. This may be carried out by raising the end of the tubular drill string so that it is positioned within the cased hole section above the open hole section so that the second displacement fluid is discharged from the end of the drill string into the cased hole section.

Sand control screens and/or liners, or other completion equipment such as packer assemblies (including swell packer assemblies) or inflow control devices (limiting the inflow of fluids into the production tubing) are then run to target depth, which may optionally be in the presence of the HIPR invert emulsions of the present disclosure. The sand control screen may be a standalone sand screen or an expandable sand screen. After the sand control screen is installed, the well may be gravel packed with a HIPR invert emulsion fluid, as disclosed herein. Further, one of ordinary skill in the art would appreciate that one or more of such completion equipment may be used in combination.

HIPR Invert Emulsion Fluids

As discussed above, the methods of the present disclosure use invert emulsion fluids having an oil/water ratio of less than 50/50, which may also be referred to as HIPR invert emulsions. The oil/water ratio in invert emulsion fluids conventionally used in the field is in the range of 65/45 to 85/15. Several factors have conventionally dictated such ranges, including: the concentration of solids in the mud to provide the desired mud weight (solids laden muds must have a high O/W ratio to keep the solids oil wet and dispersed) and the high viscosities often experienced upon increase of the internal aqueous phase (due to the greater concentration of the dispersed internal phase).

The instability of the emulsions may be explained by examining the principles of colloid chemistry. The stability of a colloidal dispersion (emulsion for a liquid-liquid dispersion) is determined by the behavior of the surface of the particle via its surface charge and short-range attractive van der Waals forces. Electrostatic repulsion prevents dispersed particles from combining into their most thermodynamically stable state of aggregation into the macroscopic form, thus rendering the dispersions metastable. Emulsions are metastable systems for which phase separation of the oil and water phases represents to the most stable thermodynamic state due to the addition of a surfactant to reduce the interfacial energy between oil and water.

Oil-in-water emulsions are typically stabilized by both electrostatic stabilization (electric double layer between the two phases) and steric stabilization (van der Waals repulsive forces), whereas invert emulsions (water-in-oil) are typically stabilized by only steric stabilization. Because only one mechanism can be used to stabilize an invert emulsion, invert emulsions are generally more difficult to stabilize, particularly at higher levels of the internal phase, and often experience highly viscous fluids.

Thus, embodiments of the present disclosure relate to invert emulsion fluids having a high internal phase concentration (<50/50 O/W), which are stabilized by an emulsifying agent without significant increases in viscosity. Additional by virtue of the greater internal phase concentration, weight may be provided to the fluid partly through the inherent weight of the aqueous or other internal phase, thus minimizing the total solid content.

As the internal aqueous phase of a given fluid system increases, the viscosity and rheological profile of the fluid also increases due to the greater concentration of the dispersed internal phase. However, the invert emulsion fluids of the present disclosure may possess rheological profiles more similar to fluids having a lower internal phase concentration, i.e., >50/50 O/W. In particular, in accordance with embodiments of the present disclosure, the fluids may possess a high shear viscosity of less than 200 at 600 rpm, and a low shear viscosity of less than 40 at 6 and 3 rpm, and less than 20 at 6 and 3 rpm in particular embodiments (all of which are measured using a Fann 35 Viscometer from Fann Instrument Company (Houston, Tex.) at 120° F.).

The HIPR fluid may also possess internal aqueous phase that is stably emulsed within the external oleaginous phase. Specifically, upon application of an electric field to an invert emulsion fluid, the emulsified non-oleaginous phase, which possesses charge, will migrate to one of the electrodes used to generate the electric field. The incorporation of emulsifiers in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 µA. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder to break would be the emulsion created with the fluid, and the more stable the emulsion is. Thus, the present disclosure relates to invert emulsion fluids having a high internal phase ratio but that also have an electrical stability of at least 50 v and at least 100 v or 150 v in more particular embodiments.

Further, the present disclosure also relates to fluids having a high internal phase ratio wherein the emulsion droplet size is smaller as compared to conventional emulsion droplets. For example, the non-oleaginous phase distributed in the oleaginous phase may have an average diameter in the range of 0.5 to 5 microns in one embodiment, and in the range of 1 to 3 microns in a more particular embodiment. The droplet size distribution may generally such that at least 90% of the diameters are within 20% or especially 10% of the average diameter. In other embodiments, there may be a multimodal distribution. This droplet size may be approximately one-third to one-fourth the size of emulsion droplets formed using conventional emulsifiers. In a particular embodiment, the emulsion droplets may be smaller than the solid weighting agents used in the fluids.

One example of an emulsifying agent that may stabilize the emulsion of the aqueous or non-oleaginous fluid within the oleaginous fluid, where the non-oleaginous fluid is present in a volume amount that is more than the non-oleaginous fluid, is an alkoxylated ether acid. In embodiment of an alkoxylated ether acid is an alkoxylated fatty alcohol terminated with an carboxylic acid, represented by the following formula:

where R is $C_6$-$C_{24}$ or —C(O)$R^3$ (where $R^3$ is $C_{10}$-$C_{22}$), $R^1$ is H or $C_1$-$C_4$, $R^2$ is $C_1$-$C_5$ and n may range from 1 to 20. Such compound may be formed by the reaction of an alcohol with a polyether (such as poly(ethylene oxide), poly(propylene oxide), poly(butylene oxide), or copolymers of ethylene oxide, propylene oxide, and/or butylene oxide) to form an alkoxylated alcohol. The alkoxylated alcohol may then be reacted with an α-halocarboxylic acid (such as chloroacetic acid, chloropropionic acid, etc.) to form the alkoxylated ether acid. In a particular embodiment, the selection of n may be based on the lipophilicity of the compound and the type of polyether used in the alkoxylation. In some particular embodiments, where $R^1$ is H (formed from reaction with poly(ethylene oxide)), n may be 2 to 10 (between 2 and 5 in some embodiments and between 2 and 4 in more particular embodiments). In other particular embodiments, where $R^1$ is —$CH_3$, n may range up to 20 (and up to 15 in other embodiments). Further, selection of R (or $R^3$) and $R^2$ may also depend on based on the hydrophilicity of the compound due to the extent of polyetherification (i.e., number of n). In selecting each R (or $R^3$), $R^1$, $R^2$, and n, the relative hydrophilicity and lipophilicity contributed by each selection may be considered so that the desired HLB value may be achieved. Further, while this emulsifier may be particularly suitable for use in creating a fluid having a greater than 50% non-oleaginous internal phase, embodiments of the present disclosure may also include invert emulsion fluids formed with such emulsifier at lower internal phase amounts.

The term "HLB" (Hydrophilic Lipophilic Balance) refers to the ratio of the hydrophilicity of the polar groups of the surface-active molecules to the hydrophobicity of the lipophilic part of the same molecules. One skilled in the art would appreciate that an HLB value may be calculated by considering the molecular weight contributions of the respective hydrophilic and lipophilic portions and taking the ratio thereof (divided by 5). Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. Generally, to form a water-in-oil emulsion, an emulsifier (or a mixture of emulsifiers) having a low HLB, such as between 3 and 8, may be desirable. In a particular embodiment, the HLB value of the emulsifier may range from 4 to 6.

In particular embodiments, the emulsifier may be used in an amount ranging from 1 to 15 pounds per barrel, and from 2 to 10 pounds per barrel, in other particular embodiments.

In addition to the emulsifying agent that stabilizes the oleaginous continuous phase and non-oleaginous discontinuous phase, the wellbore fluids may also include, for example, weighting agents.

Weighting agents or density materials (other than the inherent weight provided by the internal aqueous phase) suitable for use the fluids disclosed herein may include barite, galena, hematite, magnetite, iron oxides, illmenite, siderite, celestite, dolomite, calcite, and the like. The quantity of such material added, if any, depends upon the desired density of the final composition. Typically, weighting material may be added to result in a fluid density of up to about 24 pounds per gallon (but up to 21 pounds per gallon or up to 19 pounds per gallon in other particular embodiments). Additionally, it is also within the scope of the present disclosure that the fluid may also be weighted up using salts (such as in the non-oleaginous fluid (often aqueous fluid) discussed below). One having ordinary skill in the art would recognize that selection of a particular material may depend largely on the density of the material as typically, the lowest wellbore fluid viscosity at any particular density is obtained by using the highest density particles.

The oleaginous fluid may be a liquid and more preferably is a natural or synthetic oil and more preferably the oleaginous fluid is selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. In a particular embodiment, the fluids may be formulated using diesel oil or a synthetic oil as the external phase. The concentration of the oleaginous fluid should be sufficient so that an invert emulsion forms and may be less than about 50% by volume of the invert emulsion. In one embodiment the amount of oleaginous fluid is from about 50% to about 20% by volume and more preferably about 40% to about 20% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides.

Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of the non-oleaginous fluid is typically less than the theoretical limit needed for forming an invert emulsion. Thus in one embodiment the amount of non-oleaginous fluid is more than about 50% by volume and preferably from about 50% to about 80% by volume. In another embodiment, the non-oleaginous fluid is preferably from about 60% to about 80% by volume of the invert emulsion fluid.

Conventional methods can be used to prepare the drilling fluids disclosed herein in a manner analogous to those normally used, to prepare conventional oil-based drilling fluids. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET™, VERSACOAT™, SUREWET™, VERSAWET™, and VERSAWET™ NS are examples of commercially available wetting agents manufactured and distributed by M-I L.L.C. that may be used in the fluids disclosed herein. Silwet L-77, L-7001, L7605, and L-7622 are examples of commercially available surfactants and wetting agents manufactured and distributed by General Electric Company (Wilton, Conn.).

Conventional viscosifying agents that may be used in the fluids disclosed herein include organophilic clays, amine treated clays, oil soluble polymers, polyamide resins, polycarboxylic acids, and soaps, particularly during gravel packing by the alternate path technique (viscous fluid packing). The amount of viscosifier used in the composition can vary upon the end use of the composition. However, normally about 0.1% to 6% by weight range is sufficient for most applications. VG-69™ and VG-PLUS™ are organoclay materials distributed by M-I, L.L.C., Houston, Tex., and VERSA-HRP™ is a polyamide resin material manufactured and distributed by M-I, L.L.C., that may be used in the fluids disclosed herein. While such viscosifiers may be particularly useful during viscous fluid packing, they viscosifiers may also be incorporated into the fluid formulation for other completion operations as well.

Additionally, lime or other alkaline materials are typically added to conventional invert emulsion drilling fluids and muds to maintain a reserve alkalinity.

The fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

In various embodiments, methods of drilling a subterranean hole with an invert emulsion drilling fluid may comprise mixing an oleaginous fluid, a non-oleaginous fluid, an emulsifier, such as those described above, and in the ratios described above, to form an invert emulsion; and drilling the subterranean hole using this invert emulsion as the drilling fluid. The fluid may be pumped down to the bottom of the well through a drill pipe, where the fluid emerges through ports in the drilling bit, for example. In one embodiment, the fluid may be used in conjunction with any drilling operation, which may include, for example, vertical drilling, extended reach drilling, and directional drilling. One skilled in the art would recognize that oil-based drilling muds may be prepared with a large variety of formulations. Specific formulations may depend on the state of drilling a well at a particular time, for example, depending on the depth and/or the composition of the formation.

EXAMPLE

The following examples were used to test the stability and rheological properties of a high internal phase ratio invert emulsion, such as those described in the present disclosure.

Example 1

Various high internal phase ratio invert emulsions were formulated having the following components, as shown below in Table 1A and 1B. Specifically, the components include a C16-C18 internal olefin as the base oil, various brines having densities as described below) SUREWET®, a secondary emulsifier available from M-I L.L.C. (Houston, Tex.); and EMI-2184, an alkoxylated ether acid emulsifier available from M-I L.L.C. (Houston, Tex.). Samples 1-3 show the lack of effect of brine type on emulsion stability, while samples 4-6 investigate the effect of increasing salt density on the emulsion stability. Samples 7-9 investigate the effect of the amount of emulsifier on a 30/70 O/W ratio, and Samples 10-12 investigate the effect of the O/W ratio (50/50, 40/60, and 30/70).

TABLE 1A

| Components | 1 | 2 | 3 | 4 | 5 | 6 |
|---|---|---|---|---|---|---|
| IO C16-C18 (mL) | 72 | 72 | 72 | 92 | 92 | 92 |
| CaCl$_2$ brine (mL) | 287 (11.2 ppg) | — | — | 233 (11.6 ppg) | — | — |

TABLE 1A-continued

| Components | 1 | 2 | 3 | 4 | 5 | 6 |
|---|---|---|---|---|---|---|
| K-formate brine (mL) | — | 287 (11.2 ppg) | — | — | 233 (13.7 ppg) | — |
| $CaBr_2$ brine (mL) | — | — | 287 (11.2 ppg) | — | — | 233 (14.2 ppg) |
| SUREWET ® (g) | 2 | 2 | 2 | 2 | 2 | 2 |
| EMI-2184 (g) | 9 | 9 | 9 | 9 | 9 | 9 |
| Lime (g) | 2 | 2 | 2 | 2 | 2 | 2 |
| Barite (g) | 47 | 47 | 47 | 47 | 47 | 47 |

TABLE 1B

| Components | 7 | 8 | 9 | 10 (50/50) | 11 (40/60) | 12 (30/70) |
|---|---|---|---|---|---|---|
| IO C16-C18 (mL) | 92 | 92 | 92 | 119 | 96 | 72 |
| 25% $CaCl_2$ brine (mL) | 233 | 233 | 233 | 53 | 64 | 76 |
| SUREWET ® (g) | 2 | 2 | 2 | 2 | 2 | 2 |
| EMI-2184 (g) | 2 | 4 | 6 | 9 | 9 | 9 |
| Lime (g) | 2 | 2 | 2 | 2 | 2 | 2 |
| Barite (g) | 47 | 47 | 47 | 85 | 85 | 85 |

The invert emulsion fluids shown in Table 1 were heat aged at the temperatures shown below in Table 2A and 2B by hot rolling for 16 hours, and the rheological properties of the various mud formulations were determined using a Fann Model 35 Viscometer, available from Fann Instrument Company. The fluid exhibited the following properties, as shown below in Table 2A and 2B.

A high internal phase ratio invert emulsion fluid according to the present disclosure was formed and compared to an invert emulsion fluid at the same phase ratio, but with a conventional emulsifier, SUREMUL®, available from M-I L.L.C. (Houston, Tex.). The sample and comparative sample were formulated having the following components, as shown below in Table 3.

TABLE 3

| Components | 13 | CS1 |
|---|---|---|
| IO C16-C18 (mL) | 70.61 | 70.61 |
| $CaCl_2$ (g) | 74 | 74 |
| Water | 208 | 208 |
| SUREMUL ® (g) | — | 9 |
| SUREWET ® (g) | 2 | 2 |
| EMI-2184 (g) | 9 | — |
| Lime (g) | 2 | 2 |
| Barite (g) | 75.75 | 75.75 |

TABLE 2A

| | Sample Nos. | | | | | | | | | | |
|---|---|---|---|---|---|---|---|---|---|---|---|
| | 1 | | 2 | | 3 | | 4 | | 5 | | 6 |
| Heat Aging (° F.) | 150 | 300 | 150 | 300 | 150 | 300 | 150 | 250 | 150 | 250 | 150 | 250 |
| 600 RPM | 120 | 139 | 156 | 185 | 124 | 132 | 181 | 163 | 145 | 163 | Direct | — |
| 300 RPM | 75 | 88 | 99 | 120 | 77 | 84 | 114 | 101 | 90 | 101 | Emul | — |
| 200 RPM | 57 | 68 | 74 | 94 | 57 | 59 | 89 | 76 | 67 | 76 | — | — |
| 100 RPM | 35 | 42 | 47 | 60 | 35 | 41 | 57 | 46 | 41 | 46 | — | — |
| 6 RPM | 8 | 15 | 11 | 16 | 8 | 9 | 12 | 10 | 9 | 11 | — | — |
| 3 RPM | 6 | 12 | 10 | 14 | 7 | 7 | 9 | 8 | 7 | 9 | — | — |
| 10 s gel | 7 | 8 | 10 | 10 | 7 | 7 | 10 | 9 | 8 | 10 | — | — |
| 10 m gel | 7 | 8 | 11 | 12 | 8 | 7 | 10 | 8 | 9 | 10 | — | — |
| PV (cP) | 45 | 51 | 57 | 65 | 47 | 48 | 67 | 62 | 55 | 62 | — | — |
| YP (lb/100 $ft^2$) | 30 | 37 | 42 | 55 | 30 | 36 | 47 | 39 | 35 | 39 | — | — |
| ES (v) | 198 | 152 | 148 | 160 | 207 | 120 | 164 | 94 | 35 | 54 | 6 | — |

TABLE 2B

| | Sample Nos. | | | | | | | | | |
|---|---|---|---|---|---|---|---|---|---|---|
| | 7 | | 8 | | 9 | | 10 | 11 | 12 | |
| Heat Aging (° F.) | 150 | 250 | 150 | 250 | 150 | 250 | 150 | 150 | 150 | 300 |
| 600 RPM | 270 | 196 | 134 | 153 | 153 | 160 | 52 | 91 | 172 | 150 |
| 300 RPM | 182 | 126 | 84 | 98 | 98 | 101 | 28 | 53 | 103 | 89 |
| 200 RPM | 139 | 96 | 64 | 76 | 76 | 78 | 19 | 36 | 75 | 64 |
| 100 RPM | 94 | 60 | 41 | 46 | 46 | 49 | 11 | 20 | 46 | 38 |
| 6 RPM | 28 | 12 | 8 | 8 | 10 | 11 | 3 | 5 | 9 | 7 |
| 3 RPM | 21 | 10 | 6 | 7 | 8 | 9 | 2 | 4 | 7 | 6 |
| 10 s gel | 20 | 10 | 7 | 7 | 9 | 8 | 3 | 5 | 7 | 7 |
| 10 m gel | 21 | 10 | 8 | 8 | 9 | 9 | 4 | 6 | 8 | 8 |
| PV (cP) | 88 | 70 | 50 | 55 | 55 | 59 | 24 | 38 | 69 | 61 |
| YP (lb/100 $ft^2$) | 94 | 56 | 34 | 53 | 43 | 42 | 4 | 15 | 34 | 28 |
| ES (v) | 25 | 55 | 70 | 117 | 103 | 201 | 232 | 207 | 130 | 220 |

The invert emulsion fluids shown in Table 3 were heat aged at 150° F. by hot rolling for 16 hours, and the rheological properties of the various mud formulations were determined at 120° F. using a Fann Model 35 Viscometer, available from Fann Instrument Company. The fluid exhibited the following properties, as shown below in Table 4.

TABLE 4

|  | 13 | CS1 |
|---|---|---|
| 600 RPM | 171 | >300 |
| 300 RPM | 106 | 210 |
| 6 RPM | 11 | 41 |
| 3 RPM | 9 | 33 |
| 10 s gel | 9 | 31 |
| 10 m gel | 10 | 34 |
| PV (cP) | 65 | N/A |
| YP (lb/100 ft$^2$) | 41 | N/A |
| ES (v) | 287 | 110 |

Example 2

Various high internal phase ratio invert emulsions were formulated having the following components, as shown below in Table 5. Specifically, the components include a C16-C18 internal olefin as the base oil, various brines having densities as described below) SUREWET®, a secondary emulsifier available from M-I L.L.C. (Houston, Tex.); and DANOX-20, DANOX-21, and DANOX-22, alkoxylated ether carboxylic acid emulsifiers available from Kao Corporation (Tokyo, Japan). DANOX-20, DANOX-21, and DANOX-22 possess the same chemistry with differing amount of ethoxylation (and thus molecular weight and HLB).

TABLE 5

| Components | 13 | 14 | 15 |
|---|---|---|---|
| IO C16-C18 (mL) | 72 | 72 | 72 |
| CaCl$_2$ brine (mL) | 76 | 76 | 76 |
| Water | 212 | 212 | 212 |
| SUREWET ® (g) | 2 | 2 | 2 |
| DANOX-20 (g) | 9 | — | — |
| DANOX-21 (g) | — | 9 | — |
| DANOX-21 (g) | — | — | 9 |
| Lime (g) | 2 | 2 | 2 |
| Barite (g) | 47 | 47 | 47 |

The invert emulsion fluids shown in Table 5 were heat aged at the temperatures shown below in Table 6 by hot rolling for 16 hours, and the rheological properties of the various mud formulations were determined using a Fann Model 35 Viscometer, available from Fann Instrument Company. The fluid exhibited the following properties, as shown below in Table 6.

TABLE 2A

| | Sample Nos. | | | | | |
|---|---|---|---|---|---|---|
| | 13 | | 14 | | 15 | |
| Heat Aging (° F.) | 150 | 250 | 150 | 250 | 150 | 250 |
| 600 RPM | 143 | 167 | 134 | 173 | 136 | 160 |
| 300 RPM | 89 | 102 | 82 | 105 | 85 | 99 |
| 200 RPM | 67 | — | 61 | — | 64 | — |
| 100 RPM | 42 | — | 36 | — | 38 | — |
| 6 RPM | 9 | 11 | 7 | 10 | 8 | 10 |
| 3 RPM | 7 | 8 | 6 | 7 | 7 | 8 |
| 10 s gel | 7 | 8 | 6 | 8 | 7 | 8 |

TABLE 2A-continued

| | Sample Nos. | | | | | |
|---|---|---|---|---|---|---|
| | 13 | | 14 | | 15 | |
| 10 m gel | 7 | 9 | 6 | 8 | 8 | 9 |
| PV (cP) | 54 | 65 | 52 | 68 | 51 | 61 |
| YP (lb/100 ft$^2$) | 35 | 37 | 30 | 37 | 34 | 38 |
| ES (v) | 185 | 200 | 150 | 171 | 167 | 181 |

Example 3

A simple laboratory assessment was undertaken to assess the ability to achieve Newtonian properties when formulating an invert system with relatively high internal aqueous phase. For this assessment a low-toxicity mineral oil was used to achieve an arbitrary density of 9.0 lb/gal in a 50/50 O/W ratio HIPR fluid. Several comparative fluids were prepared using two different amido-amines at arbitrary concentrations in an attempt to achieve a Newtonian regime at a 50/50 O/W ratio. The invert fluids were prepared by first blending the emulsifier into the selected base fluid followed with the addition of lime. The internal phase, CaCl$_2$ brine, was added last. Due to the relatively high water ratio, the systems were vigorously stirred at the highest rate attainable while minimizing entrainment of air to ensure complete dispersion and to ensure emulsion stability and to mitigate inconsistency with respect to preparation. The HIPR formulation is shown in Table 3.

TABLE 3

9.0-lb/gal HIPR Formulation for a Water-Pack Fluid

| Products | lb/bbl |
|---|---|
| Base Oil | 128 |
| EMI-2184 | 8-10 |
| Lime | 2-4 |
| CaCl$_2$ Brine | 239 |

After mixing, the rheology was measured using a standard Fann 35 at 120° F. In addition, the low-shear-rate viscosity (LSRV) and the electrical stability (ES) were measured. The initial properties for the HIPR fluid are shown in Table 4, below.

TABLE 4

Properties of a 9.0-lb/gal HIPR Water-Pack Fluid at 120° F. (48.89° C.)

| Property | Value |
|---|---|
| O/W Ratio | 50/50 |
| ES (V) | 87 |
| PV/YP (cP/lb/100 ft$^2$) | 37/9 |
| 6/3-rpm Readings | 3/2 |
| Density | 9.0 lb/gal (SG of 1.08) |
| n/K value (Herschel Buckley) | 0.69/177 |

The ES and LSRV laboratory measurements were acquired to assess low-end viscosity and emulsion stability. The ES was measured to confirm that an invert emulsion was apparent. As it was surmised that a lower viscosity would promote the ability to effectively deposit the desired alpha and beta waves/dunes, the measurement and subsequent deficient LSRV would confirm this aspect. Solids suspension of biopolymer fluids has been correlated directly to LSRV measurements at 0.06 sec$^{-1}$ (0.3 rpm). Thus, this method was employed for these invert fluids. Elevated viscosity, especially the low-end, is indicative of the ability to suspend particles (e.g., gravel) thus mitigating the ability to effectively deposit especially when the velocity of the packing fluid is reduced.

Several fluids were compared to fluids formulated with EMI-2184 (at 7 pounds per barrel (ppb) and 10 ppb), an alkoxylated ether acid emulsifier, to form a HIPR fluid. The comparative fluids were formulated with VERSACOAT HF (at 2 ppb, 3 ppb and 6 ppb) an amido-amine, and ONEMUL (at 4 ppb and 7 ppb), an amido-amine with an added surfactant, both of which are available from M-I SWACO (Houston, Tex.). The fluids were formulated as shown in Table 5 below.

TABLE 5

9.0-lb/gal Formulation for a Water-Pack Fluid

| Products | lb/bbl |
|---|---|
| Base Oil | 128 |
| Emulsifier | Varies |
| Lime | 2-4 |
| CaCl$_2$ Brine | 239 |

Figure 3:
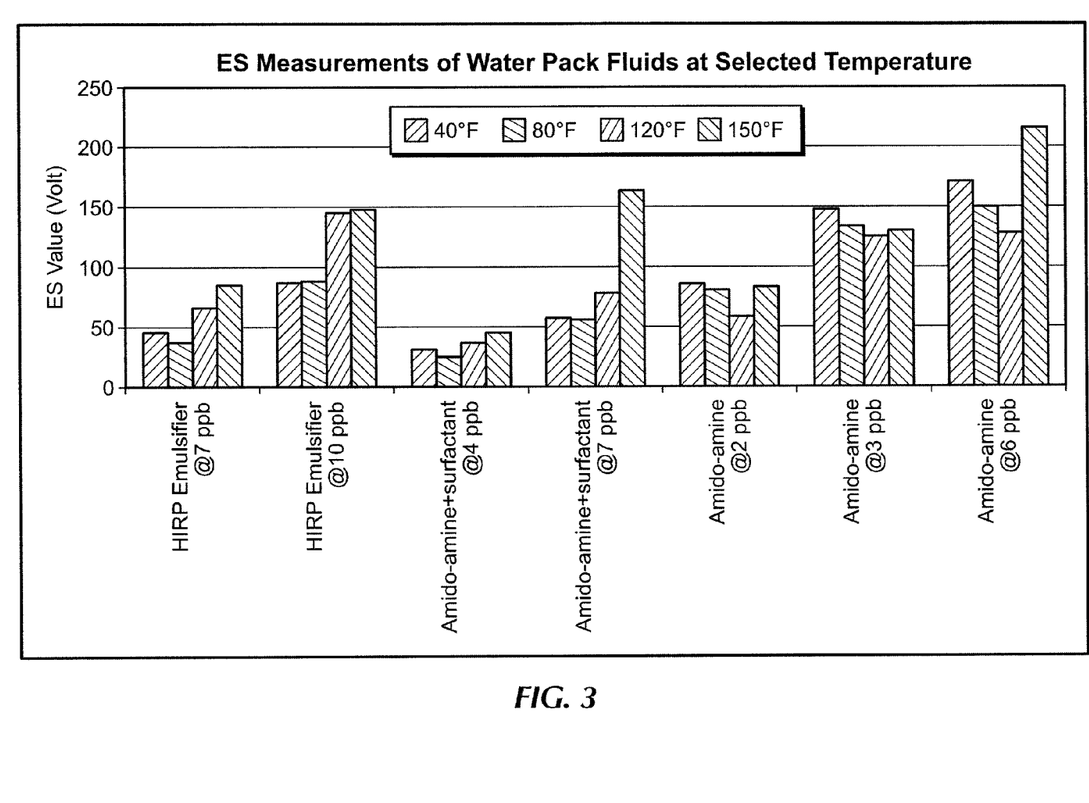
FIG. 3 shows the effect of various emulsifiers on electrical stability measured at various temperatures.

The first assessment (FIG. 3) compares the ES values for the fluid formulations as shown in Table 5, including an HIPR invert emulsion formed with the HIPR emulsifier as well as comparative fluids formulated with amido-amine surfactants at the various concentrations mentioned above. The ES was measured at four temperatures ranging from 40 to 150° F. The two fluids formulated with the HIPR emulsifier or the amido-amine plus a surfactant exhibited more consistent ES across all temperatures as well as the ability to manage the ES value with a change in concentration. From this data, the fluids emulsified with an amido-amine type emulsifier provided relatively greater ES values across all temperatures. Even with decreased concentration, this emulsifier provided elevated ES values. For these fluids, laboratory observations showed a low ES is indicative of less viscosity as would be expected when solids are not introduced.

Figure 4:
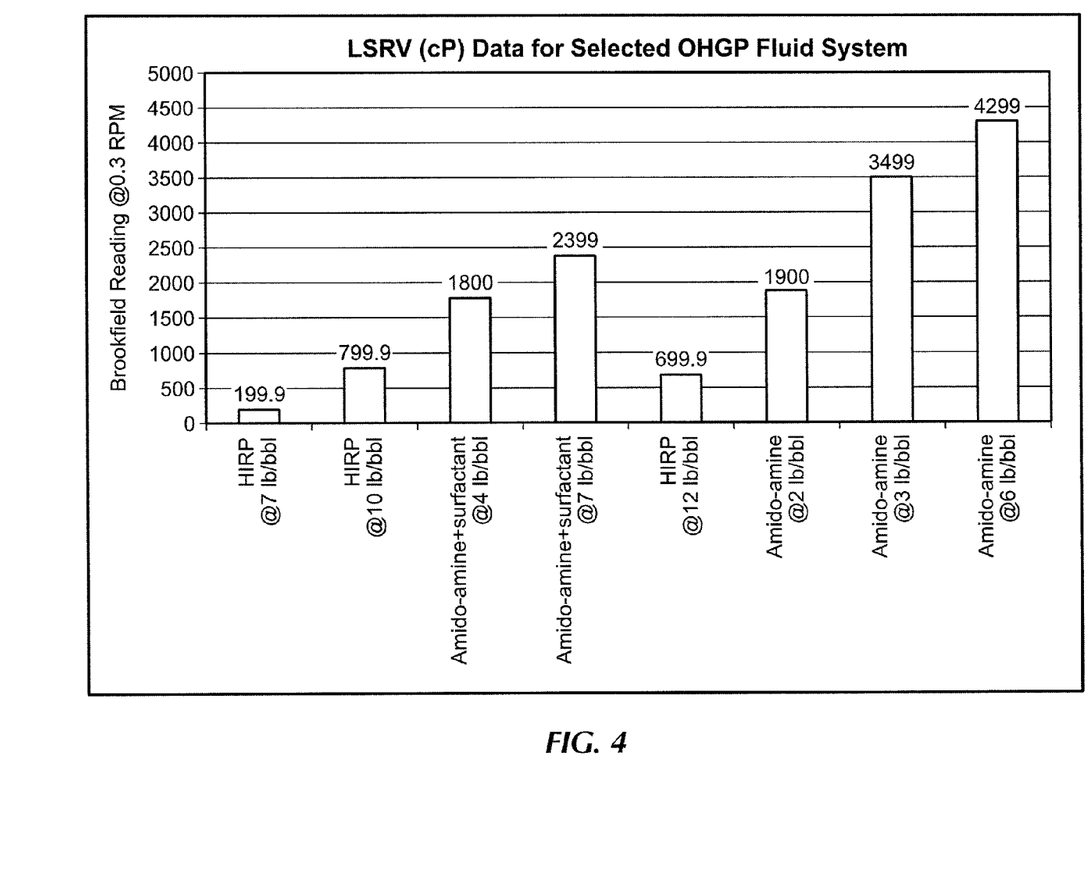
FIG. 4 shows the effect of using various emulsifiers on low shear rate viscosity.

To further assess the ability to create a HIPR water packing fluid with O/W ratio of 50/50 while mitigating viscosity, these fluids were evaluated using a Brookfield viscometer. FIG. 4 shows a comparison of the LSRV values at 0.3 rpm. These values show that the amido-amine and amido-amine plus surfactant generated more viscosity at this shear rate than the HIPR emulsifier, almost 9.5 to 11 times more.

The fluids were also subjected to a wettability evaluation. This test was performed to confirm that a system formulated with the HIPR emulsifier would continue to function as an emulsion thus mitigating the relatively large water or brine fraction's contact with either water-sensitive shale or the target formation rock. The HIPR fluids was subjected to a simple wettability test before and after adding 1.0-lb/gal proppant to a fluid prepared as documented above in Table 4. This fluid was prepared using 7 lb/bbl of HIPR emulsifier. After blending and aging for 16 hours at 150° F., a small portion or volume was extracted using a plastic pipette and then placed into a beaker of tap water. A stable emulsion or invert upon contact with water will yield a sphere as it seeks to attain the smallest possible surface area. In contrast, if the emulsion or invert exhibits a cloudy dispersion or stingy texture, this indicates poor or unstable emulsified fluid. The fluid prepared with the HIPR emulsifier exhibited sphere-like droplets and is indicative of a stable emulsion with a measured ES of approximately 40 to 80 volts.

It is surmised that this fluid would maintain a stable emulsion in a wellbore of similar bottomhole temperature while providing an oil-wet environment as opposed to water-wetting (potentially damaging the target reservoir rock or shale rock). The authors surmise that the HIPR emulsifier's ability oil-wet as well as maintaining a stable ES in combination with low viscosity and LSRV would provide an alternative for water-packing where shale rock is prevalent, thus lowering the risk for premature sand-out.

To further assess the stability of a fluid formulated with the HIPR emulsifier, static aging tests were performed. Again the fluids were compared to the conventional amido-amine plus surfactant at 4 and 7-lb/bbl concentrations. All samples were statically aged at three different temperatures to simulate a wellbore environment. Before heat aging, all fluids exhibited a stable invert emulsion, as expected, with no separation apparent. After static aging, the fluid formulated with an amido amine type emulsifier showed relatively more syneresis or phase separation, visually up to 15 vol %, whereas, in the fluids formulated with an HIPR emulsifier, no separation is apparent. However, the syneresis was readily resolved for the amido-amine fluid with simple agitation as would be typical for any properly formulated invert. The ability of the HIPR emulsifier to mitigate syneresis may prove beneficial for pre-bending and even mitigating separation in the wellbore during static conditions.

Figure 5:
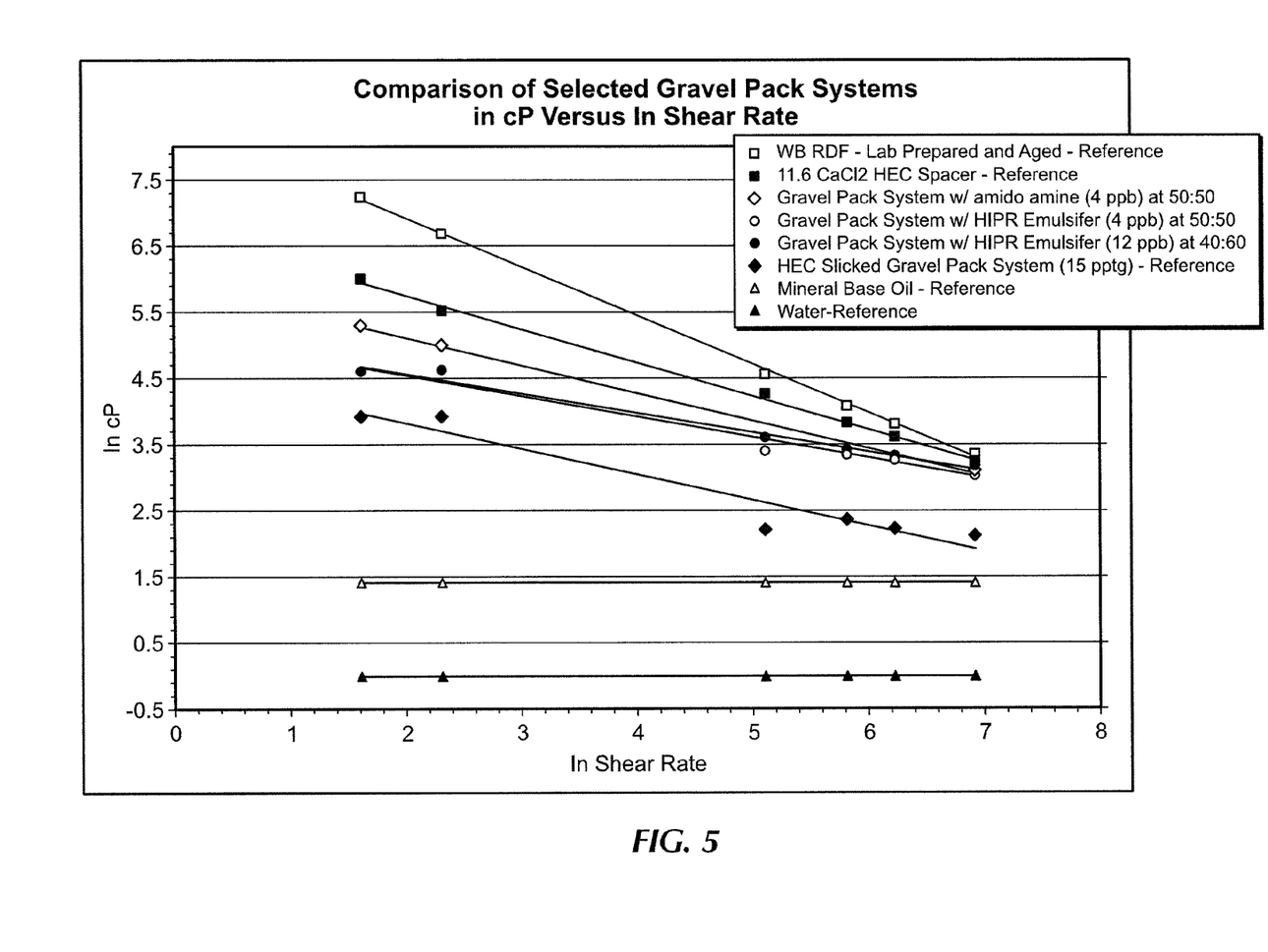
FIG. 5 shows a plot of viscosity versus shear rate for various gravel pack systems.

As a final comparison, the rheology was measured at 120° F. for the previous HIPR fluids plus an invert system with 4-lb/bbl amido-amine plus surfactant. This data was again plotted as the natural log of viscosity (cP) versus the natural log of the shear rate for comparison (FIG. 5). In addition, several conventional systems were included for reference. The HIPR fluids formulated with 50/50 and 40/60 O/W ratios, exhibited relatively similar slopes, as well as exhibited lower viscosity than a conventional amido amine fluid. The slopes of the HIPR fluids exhibited a flatter profile versus an HEC slicked system, thus approaching a more Newtonian regime.

Example 4

For this assessment, laboratory tests were conducted using the HIPR emulsifier to formulate fluids to a density of 10.5 lb/gal. Three different completion brines—11.8-lb/gal sodium bromide, 11.5-lb/gal calcium chloride, and 11.7-lb/gal potassium formate—were incorporated to assess their compatibility with the HIPR emulsifier. Thus, the O/W ratios varied from 23/77 to 34/66 to attain the target density. These systems were blended in the same manner as described before. The rheology is shown in Table 6 and was measured at a temperature of 85° F. to assess surface conditions.

TABLE 6

10.5-lb/gal HIPR Screen Running Fluids Rheology Measured at 120° F.

| | Temperature | | |
|---|---|---|---|
| | 85° F. | 85° F. | 85° F. |
| Brine Type | CaCl$_2$ | NaBr | KCOOH |
| O/W Ratio | 23/77 | 29/71 | 34/66 |
| 600-rpm Reading | 245 | 205 | 300+ |
| 300-rpm Reading | 152 | 132 | 240 |
| 200-rpm Reading | 116 | 102 | 195 |
| 100-rpm Reading | 72 | 67 | 140 |
| 6-rpm Reading | 10 | 16 | 49 |
| 3-rpm Reading | 6 | 12 | 42 |
| 10-sec Gel (lb/100 ft$^2$) | 7 | 12 | 39 |
| 10-min Gel (lb/100 ft$^2$) | 6 | 11 | 39 |
| PV (cP) | 93 | 73 | n/a |
| YP (lb/100 ft$^2$) | 59 | 59 | n/a |

From this data, the use of these brines parallels the rheology measured in Table 2 above (for Samples 1-3). These results indicate that potassium formate brine requires less concentration of the HIPR emulsifier. The fluids formulated with $CaCl_2$ and NaBr exhibit rheology conducive for displacing/running a sand control screen or liner.

Advantageously, embodiments of the present disclosure may provide invert emulsion fluids having a high internal phase concentration (<50/50 O/W), which are stabilized by an emulsifying agent without significant increases in viscosity, making the fluids particularly suitable for use in open hole completion operations, as a displacement fluid, for running liners and/or sand control screens, as well as gravel packing by with alpha and beta waves or by an alternate path technique. Additionally by virtue of the greater internal phase concentration, weight may be provided to the fluid partly through the inherent weight of the aqueous or other internal phase, thus minimizing the total solid content, which is particularly desirable for completion operations in which a no solids content is often desired. Further, such fluids may be particularly desirable for use in open hole wells exposed to reactive shales, by minimizing the potential contact of such reactive shales with water. The HIPR invert emulsions may make it practical for a well to be drilled and completed only with oil-based fluids, avoiding contact of the formation with brines, which can have a negative effect on the production of the wells.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method of gravel packing a wellbore in a subterranean formation, the wellbore comprising a cased section and an uncased section, the method comprising:
    pumping into the wellbore a gravel pack composition comprising gravel and a carrier fluid comprising an invert emulsion fluid, the invert emulsion fluid comprising:
        an oleaginous external phase;
        a non-oleaginous internal phase, wherein a ratio of the oleaginous external phase and non-oleaginous internal phase is less than 50:50 and
        an emulsifier stabilizing the oleaginous external phase and the non-oleaginous internal phase, wherein the emulsifier is an alkoxylated ether acid.

2. The method of claim 1, further comprising:
    packing the uncased section of the wellbore with gravel using alpha and beta waves of the carrier fluid.

3. The method of claim 1, further comprising:
    packing the uncased section of the wellbore with gravel using alternate path technology.

4. The method of claim 1, wherein an average diameter of the non-oleaginous internal phase ranges from 0.5 to 5 microns.

5. The method of claim 4, wherein the average diameter ranges from 1 to 3 microns.

6. The method of claim 1, wherein the ratio of the oleaginous external phase to non-oleaginous internal phase is less than 40:60.

7. The method of claim 1, wherein the ratio of the oleaginous external phase to the non-oleaginous internal phase is less than 30:70.

8. The method of claim 1, wherein the invert emulsion fluid has a high shear viscosity of less than 200, measured at 600 rpm, and a low shear viscosity of less than 40 at 6 and 3 rpm.

9. The method of claim 1, wherein the fluid has an electrical stability of at least 30 v.

10. The method of claim 1, wherein the alkoxylated ether acid is an alkoxylated fatty alcohol terminated with an acetic acid.

11. The method of claim 1, wherein the alkoxylated ether acid is represented by the following formula:

where R is $C_6$-$C_{24}$ or —$C(O)R^3$ (where $R^3$ is $C_{10}$-$C_{22}$), $R^1$ is H or $C_1$-$C_4$, $R^2$ is $C_1$-$C_5$ and n may range from 1 to 20.

12. The method of claim 11, wherein when $R^1$ is H, n is a value up to 10.

13. The method of claim 11, wherein n ranges between 2 and 5.

14. The method of claim 11, wherein when $R^1$ is —$CH_3$, n is a value up to 20.

15. The method of claim 1, wherein the emulsifier is used in an amount ranging from 1 to 5 pounds per barrel.

* * * * *